United States Patent
Keast et al.

(10) Patent No.: US 8,548,432 B2
(45) Date of Patent: *Oct. 1, 2013

(54) AUTHENTICATING VOICE CALLS FROM MOBILE DEVICES

(75) Inventors: Liam John Keast, Bedford (CA); Bradford Lawrence Spencer, Hammonds Plains (CA); Manvinder Singh, Bedford (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,205

(22) Filed: Aug. 29, 2012

(65) Prior Publication Data

US 2012/0321066 A1 Dec. 20, 2012

Related U.S. Application Data

(63) Continuation of application No. 12/636,990, filed on Dec. 14, 2009, now Pat. No. 8,301,117.

(51) Int. Cl.
*H04M 1/66* (2006.01)
*H04M 1/68* (2006.01)
*H04M 3/16* (2006.01)

(52) U.S. Cl.
USPC ........ 455/411; 455/410; 455/414.1; 455/415; 455/416; 455/418; 455/419; 455/420; 455/422.1; 455/564; 379/88.02; 379/142.05; 370/310.2; 370/328; 370/338; 709/217; 709/218; 709/219

(58) Field of Classification Search
USPC ...... 455/410–411, 414.1, 415–416, 418–420, 455/422.1, 564; 370/310.2, 328, 338; 709/217, 709/218, 219; 379/88.02, 142.05
See application file for complete search history.

(56) References Cited

U.S. PATENT DOCUMENTS

| | | |
|---|---|---|
| 5,003,595 A | 3/1991 | Collins et al. |
| 7,792,062 B1 * | 9/2010 | Fandrianto et al. ........... 370/260 |

(Continued)

FOREIGN PATENT DOCUMENTS

| | | |
|---|---|---|
| GB | 2397731 | 7/2004 |
| WO | 9749217 | 12/1997 |

OTHER PUBLICATIONS

Extended European Search Report mailed Sep. 27, 2010, in corresponding application No. 09179146.7.

(Continued)

*Primary Examiner* — Steve D Agosta
(74) *Attorney, Agent, or Firm* — Novak Druce Connolly Bove + Quigg LP

(57) ABSTRACT

Aspects relate to authorizing mobile devices for PBX-based voice services. A mobile device calls a PBX over a voice channel, and phone number identifier information is obtained and matched to identifier information for devices that known (authorizeable) to use the PBX. If there is one incoming call that matches to a given device, and an authentication token provided over a data channel matches an authentication token associated with that device, then the device is authorized for voice services. Where there are multiple matching calls, those devices are instructed to provide authentication tokens over their voice channels. The devices can detect absence of a data channel and provide authentication tokens over the voice channels; the devices also can wait to receive a call connected response and in the absence of such provide their authentication tokens over the voice channel. Tokens can be requested and downloaded for storage at the devices.

11 Claims, 6 Drawing Sheets

(56) References Cited

U.S. PATENT DOCUMENTS

| | | | |
|---|---|---|---|
| 7,991,137 B2 * | 8/2011 | Shields | 379/204.01 |
| 2006/0270388 A1 | 11/2006 | Veeramachaneni et al. | |
| 2007/0190975 A1 | 8/2007 | Eonnet | |
| 2009/0110156 A1 | 4/2009 | Hosteny et al. | |

OTHER PUBLICATIONS

Extended European Search Report mailed Jul. 19, 2010, in corresponding application No. 09179101.2.

Cellcrypt—http://www.cellcrypt.com/details.html. Retrieved on May 7, 2012.

3G wireless Networks—Clint Smith, Clint Smith (P.E.), Daniel Collins—Google Book. http://books.google.ca/books?id=KM0U__zqaa8cC&pg=RA1-PA64&lpg=. Retrieved on May 7, 2012.

Extended European Search report mailed Jun. 10, 2010, in corresponding European patent application No. 09179146.7.

Examination Report mailed Jul. 5, 2012, in corresponding European patent application No. 09179146.7.

* cited by examiner

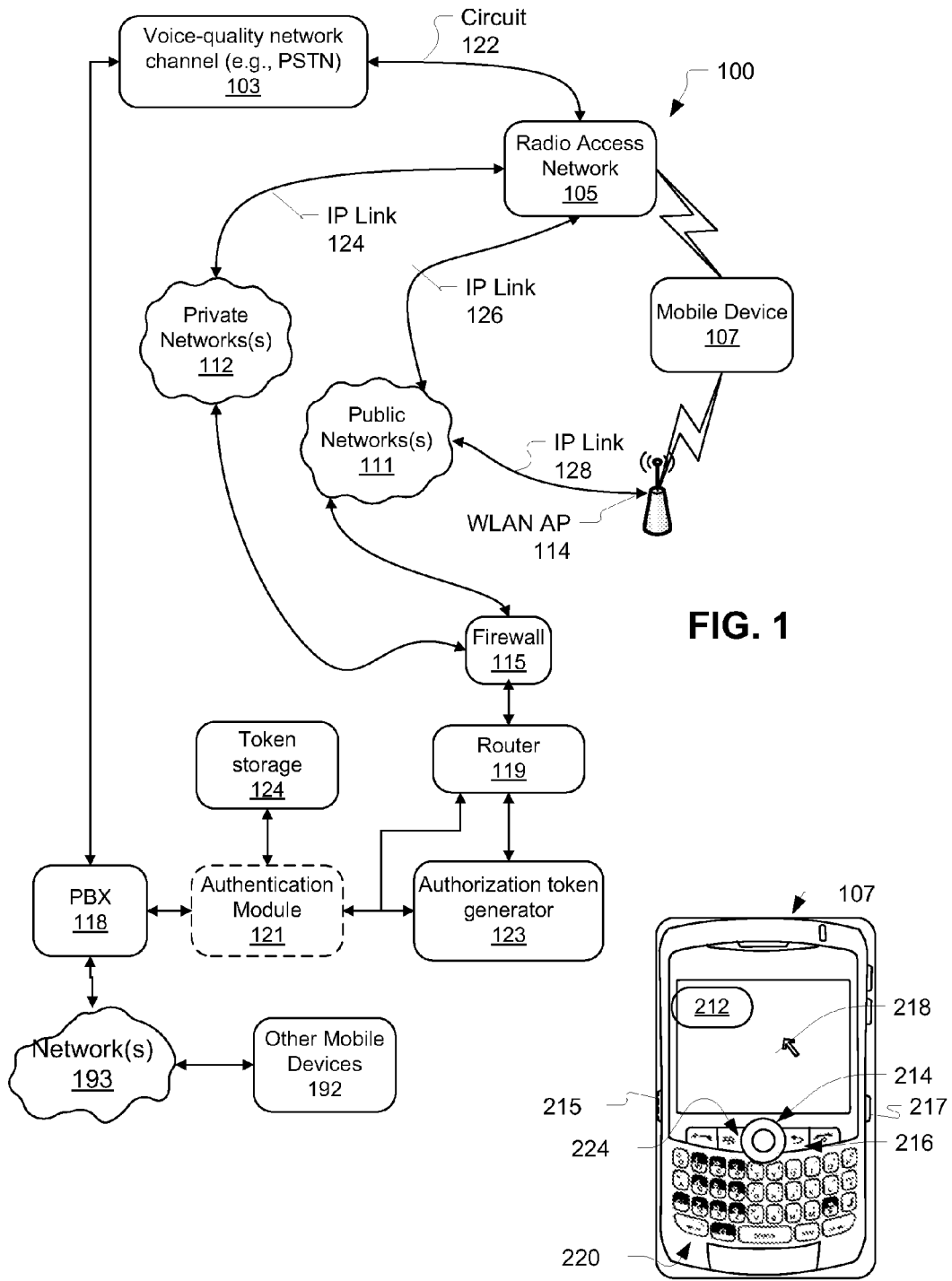

AUTHENTICATING VOICE CALLS FROM MOBILE DEVICES

CROSS-REFERENCE TO RELATED APPLICATION

This application is a continuation of U.S. application Ser. No. 12/636,990, filed Dec. 14, 2009, which is fully incorporated by reference herein.

BACKGROUND

1. Field

The following relates to data and voice-enabled devices, such as data-enabled mobile phones, digital assistants, and smartphones, and more particularly to authentication of such devices for access to voice services.

2. Related Art

Although much emphasis has been placed, of late, on providing data communication capabilities on mobile phones, voice services and voice communications remain an important feature to be made available on mobile devices. In corporate networks, voice services can include voice conferencing services, for example. Mobile devices may be used for "dialing in" to such voice conferences. However, authenticating a mobile device over a voice channel is different from authenticating that device over a secure data channel. For example, caller ID information may be available for the mobile device, but such information can be spoofed and sometimes is not available. In the case, of conference calls, a number can be distributed with a meeting invitation to allow users to dial in. However, voice channels are prone to eavesdropping, and if the number were intercepted or captured, then it could be used for dialing into the conference. Also, other voice services may be available from or through a Private Branch eXchange (PBX), to which mobile devices should be given conditional access. Therefore, advances in authentication of mobile devices for use of services available over voice channels continue to be desirable.

BRIEF DESCRIPTION OF THE DRAWINGS

FIG. 1 depicts an example system view where a mobile device authorizes for using PBX services using a token obtained over a data channel and presented over a voice channel;

FIG. 2 depicts an example of a form factor for a device that can be used in the system of FIG. 1;

DESCRIPTION

Figure 3:
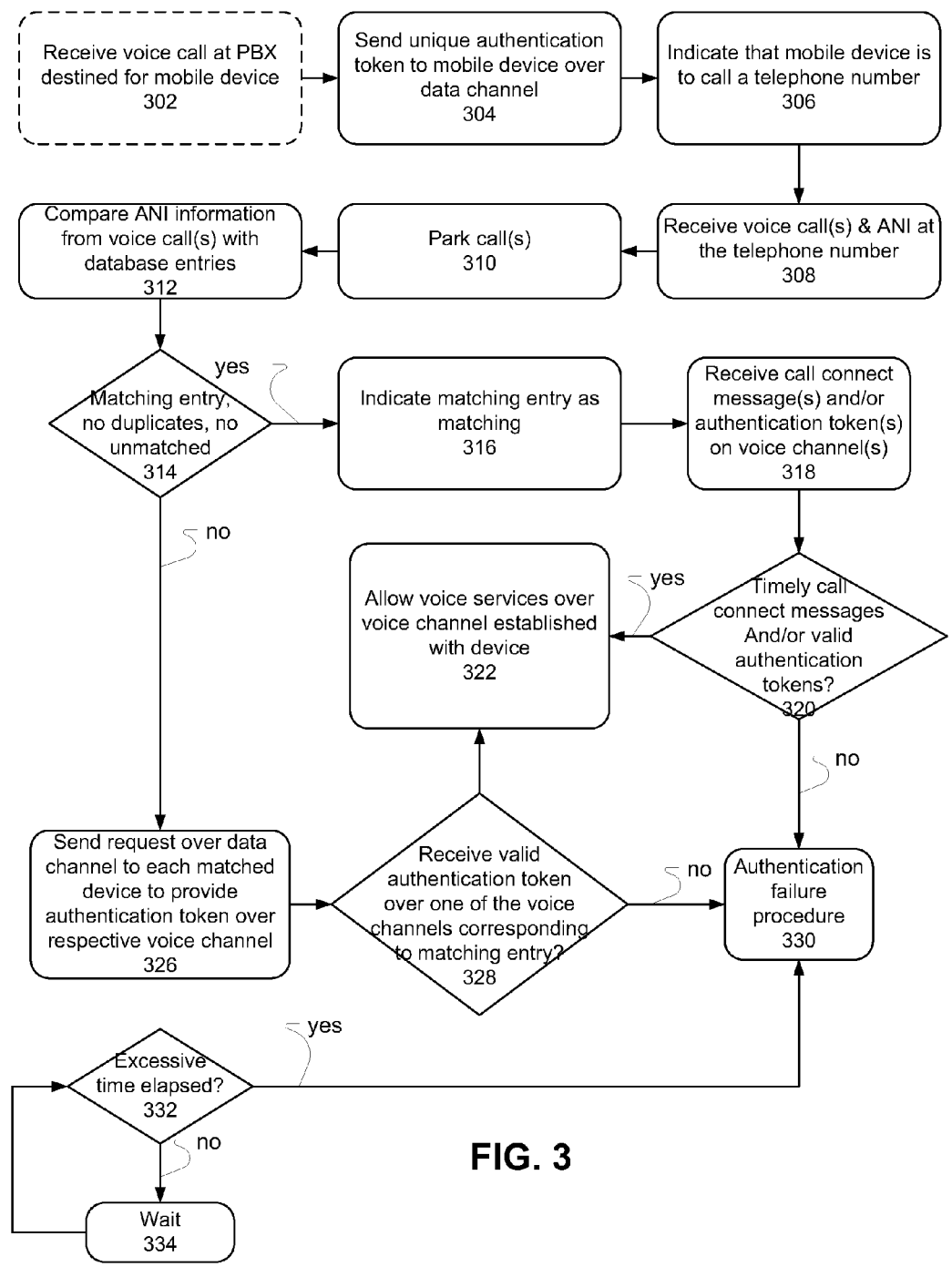
FIG. 3 depicts a method for authentication devices to use voice services in a system according to FIG. 1.

The following description provides examples and other disclosure, which teach those of ordinary skill in the art how to practice implementations and embodiments of inventive aspects described herein. As such, the description is not limiting, but rather is exemplary.

For convenience, in this description, the terms "mobile device" and "mobile communications device" generally are used to refer to any portable or mobile network-enabled device that has capabilities to send and receive voice calls and to send and receive data, such as data generated by web browsing, e-mail, SMS, instant messaging, and the like. As will become clear, a variety of devices in a variety of form factors can meet such a definition, including, for example, smartphones, laptops configured with appropriate network connections and user input devices, tablet computers, navigation devices embedded in automobiles, and netbooks.

In some cases, services available over a voice network are sensitive, and should be secured to reduce or prevent unauthorized access. Such services can be sensitive, because they can be expensive to provide. Some services, if compromised, can cause privacy breaches, and losses of confidential or proprietary information. In other cases, it would be desirable to have better confidence in the identity of who or what devices are using particular resources, or even to track usage of such resources by certain devices.

By contrasting example, in a corporate setting, a teleconference bridge can be arranged for a teleconference that is intended to involve a group of participants; a bridge token can be disseminated for access to the teleconference, as well as other information such as a number to dial. However, depending on how the token is disseminated, such as via a calendaring program that sends meeting invites, that token can be easily distributed beyond its intended audience. Further, when attendees join the conference, an undifferentiated token does not provide a means to audit who attended and who did not. Using caller identification information is less than perfect for these purposes, because it can be spoofed and is not necessarily available. Also, when a user joins a conference with such an undifferentiated token, an eavesdropper can learn the token and either join that conference, or in some cases, save that token for future use.

Further, other services that can be made available through a Private Branch eXchange (PBX) include allowing dial-out from the bridge by mobile devices. For example, if a user desires to avoid disclosing his mobile number to a called party, and instead appear to be calling from a corporate PBX, then the user can call into the PBX, have the PBX dial a particular number and join the user call to the PBX with the PBX call to the called party. Since such approaches can incur toll charges, and for other reasons, access to such services by unauthorized devices or persons ideally should be prevented.

The term PBX is used herein to refer to one or more servers and related equipment that provides capabilities associated by those of ordinary skill in the art with a PBX. A PBX need not be a physically separate item of equipment, as such capabilities can be implemented using software and add-in cards on a computer. The computer can be a computer physically located at a site owned by a given entity (e.g., a company), which is provided such PBX capabilities thereby. However, such computer can also be hosted at another location, and PBX capabilities can be provided as a service to the entity. As such, the usage of the term PBX and the depicted of a PBX in the referenced figures is used for ease of explanation and reference to PBX functions, rather than by way of implied limitation concerning how such functions are provided in a given implementation.

In some aspects herein, a PBX can be used as a focal point for establishing communications between two parties. For example, a call can be placed by a calling party to a phone number that the calling party associates with an authorized user of the PBX (e.g., an employee of the company to which the PBX is associated). The calling party may believe that the number dialed is an office number, or it may be a sole contact number provided to the calling party. The PBX can indicate to the device associated with the authorized user that a call was incoming for the user. The called device can be made to call the PBX, and the PBX can connect the two calls, thus establishing voice communication between the calling party and the authorized user of the PBX. In such aspects, authenticating the device calling into the PBX is desirable.

Such authentication in the above examples is desired to prevent unauthorized eavesdropping, abuse or unauthorized use of PBX services, or even interception of calls intended for a given authorized user.

Such authentication, in one example herein, is provided in a system comprising a PBX and one or more mobile devices that can communicate with the PBX over a data channel receiving authentication tokens over the data channel that can be used for authenticating the mobile device during establishment of a voice channel. In a more particular example, a system can provide voice services to mobile devices, for which data can be carried over switched circuit voice channels, and data communication that can be carried by data channels, such as packet networks that use Internet Protocol (IP) addressing and transport layers such as Transport Control Protocol (TCP) and/or User Datagram Protocol (UDP).

These aspects relate to a mobile device requesting an authentication token over a data channel to be used for authenticating over the voice channel. Examples of procedures as to how the authentication token can be used for authenticating the mobile device are provided. In one example, the authentication token is presented on the data channel by the mobile device after establishing a voice channel connection. The token also can be presented over that established voice channel as a series of audible tones that can be carried on the voice channel, preferably when automatic number identification information does not identify a sole voice channel that can be associated with a given device.

Preferably, the token is associated with permissions that allow the token to be used only once to authenticate. A database of issued and valid tokens can be maintained by a token issuer for use in comparisons to verify authenticity of devices presenting information as valid tokens. For example, a set of possible tokens can be established, and upon provision of a token of the set for use by a particular mobile device, that token can be indicated as being unavailable until after it either expires or is used for authentication. Preferably, no single token is issued to more than one device or user at any given time, such that the token can be used as a basis both for identification (in embodiments that track to which user or device a given token was issued) and authentication.

In a more-specific example, FIG. 1 depicts a system architecture 100 in which a data and voice-enabled mobile device 107 can operate. A Radio Access Network (RAN) 105 provides broadband wireless access to device 107. Radio access network (RAN) 105 communicates wirelessly with device 107, and connects device 107 via a circuit 122 with a voice-quality network channel 103. Voice-quality network 103 can serve as a bearer channel for voice calls in which mobile device 107 participates, and can comprise portions of the Public Switched Telephone Network (PSTN).

RAN 105 also can connect through an IP link 124 to private network(s) 112 and through an IP link 126 with public network(s) 111. Usage of IP is exemplary and other addressing systems can be provided. For example, private networks 112 can use X.25 addressing and also can be implemented using Virtual Private Network (VPN) technology to carry data over public networks 111.

Mobile device 107 also can have an interface for communication using local area wireless network technologies, such as 802.11 series technologies. When using such technologies for communication, mobile device 107 typically interfaces with a wireless LAN access point 114, which can communicate over public network(s) 111, such as through a router (not depicted). Communications on this medium also can be addressed using IP, as depicted by labeling the link IP link 128.

Preferably, these data interfaces are used to carry encrypted communications. For example, authentication token generator 123 can encrypt token information using a public key associated with mobile device 107. In other cases, a link between authentication token generator 123 and mobile device 107 (or another suitable device in a network trusted by authentication token generator 123) can be ciphered using bulk encryption with a shared secret key. However, voice communications (e.g., carried on circuit 122 and voice-quality network channel 103) typically are not encrypted and a token provided from authorization server 123 to mobile device 107 on that medium could be more easily intercepted.

Each voice call in which mobile device 107 is terminated at a far end, and in the present example of FIG. 1, calls that are directed to a PBX 118 can be terminated by PBX 118, or optionally by an authentication module 117. If calls are terminated by PBX 118, then an authentication module 121 can be provided for communication with PBX 118 (although separately identified, such an authentication module can also be integrated into PBX 118). Either authentication module 117 or 121 can communicate with an authentication token content generator 123. Token content generator 123 can communicate with a router 119, which in turn can communicate with a firewall 115. Although separately identified for discussion purposes authentication token content generator 123 can be integrated with PBX 118, or with authorization module 121 Firewall 115 can direct communication to and receive communication from public network(s) 111 and private network(s) 112. Examples of communications that may be carried over the depicted voice and data communication channels is further described with respect to FIG. 2.

FIG. 1 also depicts the existence of other networks 193 and other devices 192, which can call into PBX 118. The existence of such other devices 192 is for setting context that PBX 118 may be getting any number of incoming voice calls at a given time. For example, a larger PBX, for a company or company site with several thousand employees would be expected to have a large number of calls incoming to the PBX in any given period of time. Thus, PBX 118 desirably should be able to authenticate these devices, and also to match such devices with the appropriate service (for example, if there was a call incoming to the PBX for a particular device, PBX 118 should voice call from the correct and authenticated device to that incoming call).

Referring to FIG. 2, there is depicted an example of mobile device 107. Mobile device 107 comprises a display 212 and the cursor or view positioning device 214 shown in this embodiment is a trackball 214, which may serve as another input member and is both rotational to provide selection inputs and can also be pressed in a direction generally toward housing to provide another selection input. Trackball 214 permits multi-directional positioning of a selection cursor 18, such that the selection cursor 218 can be moved in an upward direction, in a downward direction and, if desired and/or permitted, in any diagonal direction. The trackball 214 is in this example situated on a front face (not separately numbered) of a housing 220, to enable a user to maneuver the trackball 214 while holding mobile device 107 in one hand.

The display 212 may include a selection cursor 218 that depicts generally where the next input or selection will be received. The selection cursor 218 may comprise a box, alteration of an icon or any combination of features that enable the user to identify the currently chosen icon or item. The mobile device 107 in FIG. 3 also comprises a programmable convenience button 15 to activate a selected application such as, for example, a calendar or calculator. Further, mobile device 107 can include an escape or cancel button 216, a camera button 217, a menu or option button 224 and a keyboard 220. Camera button 217 is able to activate photo-capturing functions when pressed preferably in the direction towards the housing. Menu or option button 224 loads a menu or list of options on display 212 when pressed. In this example, the escape or cancel button 216, menu option button 224, and keyboard 220 are disposed on the front face of the mobile device housing, while the convenience button 215 and camera button 217 are disposed at the side of the housing. This button placement enables a user to operate these buttons while holding mobile device 107 in one hand. The keyboard 220 is, in this example, a standard QWERTY keyboard.

Now turning to FIG. 3, an example method is depicted in which a PBX (e.g., a computer system implementing PBX-type functionality) can embody aspects disclosed herein. A PBX can receive (302) a voice call which is for a mobile device which is to be allowed access to services provided through the PBX. For example, the mobile device can be associated with an employee of a company owning the PBX, and the voice call can be at the PBX, which is currently configured to follow the user from an office phone to the mobile device. The PBX can send (304) to the mobile device an authentication token over a data channel. This authentication token preferably is unique among the authentication tokens issued to a given pool of devices at any time. Such pool can be all mobile devices that can be authorized (authorizeable devices). The PBX also can indicate (306) to the mobile device to call a telephone number, such as a Dialed Number Identification Service (DNIS) number, which can be pre-stored on the mobile device, or it can be specified in the indication. The indication can be provided with the authentication token (or implied based on receipt of the authentication token). The indication can be provided from time to time, such as daily, weekly, monthly, or on another schedule.

Subsequently, PBX 118 can receive (308) any number of voice calls at the DNIS number (e.g., there can be received an arbitrary number of calls, at least one of which may be the mobile device which is intended to call in, while the others can be other authorized mobile devices, which are attempting to access different voice services, or attackers attempting to gain unauthorized access to PBX 118, or to connect to PBX 118 and impersonate mobile device 107 for the purposes of the particular connection being built. As each call is received, a timeout process can be started (309), which can run concurrently with the other call processing elements disclosed, such that if the timeout process indicates that timeout has occurred, then that call can be disconnected, and restarted. In other examples, such timeout processes can be started at 302, such that when PBX 118 begins interaction with a mobile device, a timer can begin countdown.

PBX 118 parks (310) each of the calls, e.g., PBX 118 answers the calls and then puts the calls in a wait state. PBX 118 is programmed to receive Automatic Number Identification (ANI) information obtained from the calls; ANI information also can be referred to as calling party identification information. ANI information may be unavailable for some calls, and PBX 118 may treat those calls differently, as explained in the examples that follow. The ANI information obtained is compared with a database of numbers associated with mobile devices that are authorizeable to use PBX 118 (e.g., these are the mobile devices which have been registered with the database, such as by issuance to employees of a company owning PBX 118). Caller ID information can be used in addition or in substitution for ANI information; however, using ANI information is preferred, as it generally is more available and more difficult to spoof than caller ID information.

The depicted method then includes several decisions based on the results of the comparison of the ANI information for the calls, and the database entries. These decisions are exemplary, and a person of ordinary skill would be able to construct a different set of decisions that would be logically equivalent to those presented here. For ease of explanation, the depicted decision points in FIG. 3 may contain a plurality of elements. Decision 314 includes these elements: (1) whether there is a matching entry between the ANI information for one call, (2) that no incoming call had that same ANI information, and (3) that no other incoming call had ANI information which failed to match a database entry (i.e., each incoming call was associated with some identifier information in the database). If these elements of decision 314 were all true, then the income voice call from mobile device 107 is considered matched 316).

The method can continue with receiving (318) a call connect message over the data channel from mobile device 107, with data for an authentication token that was previously sent to mobile device 107. The method preferably would include receiving such a call connect message, but depends on continued availability of the data channel from mobile device 107.

On the data channel, a robust encryption and authentication mechanism can be employed between mobile device 107 and PBX 118. For example Advanced Encryption Standard (AES) can be used for bulk encryption, while symmetric keys can be shared using an asymmetric encryption scheme, where PBX 118 encrypts a proposed symmetric key using a public key associated with mobile device 107. Other authentication measures can be employed, such as a secure ID application, with settings shared between mobile device 107 and PBX 118.

In one example, it was disclosed that the authentication token can be provided over the data channel in a call connected message from a device making a voice call (e.g., device 107) to PBX 118, embodiments need not provide the authentication token in such a message. However, such token need not be provided in preferred embodiments that comprise a secure/trusted data channel between PBX 118 and device 107, because the secure/trusted channel itself provides the authentication of device3 107 to PBX 118. In such cases, the call connected message can instead function primarily as an alert to PBX 118 that the mobile device sending such message is attempting to make a voice call.

For each call connected message received, a decision can be made as to whether the call connected message was received timely (e.g., within a certain number of seconds from receipt of a voice call, or within a defined number of seconds from sending a call indication to mobile device 107). A decision also can be made as to whether the authentication token is valid. If the message was timely received and the token was valid, then voice services to the matched voice call can be allowed (322). To summarize, in this portion of the depicted method, it was determined that there was a single voice call coming into PBX 118 which matched given ANI information, and that there were no remaining voice calls, for which ANI information yielded no matches. Upon receiving call connect message over a data channel, which can be authenticated with reasonably high confidence to have originated from a mobile device associated with the matching ANI information, voice service can be provided on the voice channel which was matched.

So, in this method portion, because there was no call that was either potentially claiming to have the same ANI information, or for which ANI information was unclear, the method did not proceed to further steps to disambiguate or verify which voice call was from mobile device 107 (if any).

The following disclosure relates to a portion of the depicted method where there is one or more of duplicate calls with the same ANI information or calls that did not match to any identifying information. In such a circumstance, PBX 118 sends (326) requests over the data channel to devices, requesting that they provide an authentication token over their respective voice channel. The devices to which the request would be sent include devices identified based on ANI information and devices for which a call connect message was received. In other words, it is contemplated that call connect messages from mobile devices would be received in time for PBX 118 to be able to understand that particular devices are attempting to call in, and then PBX 118 would attempt to find a call (matched or matched), which belongs that each device. Other embodiments can send the request over the voice channel to all unmatched devices, but in large systems, such embodiments are not preferred.

If a valid authentication token was received (328) over a single voice channel, then voice services can be allowed (322). If there was not such a token received, then the method can proceed (330) to an authentication failure procedure, an example of which is described below.

The depicted method also includes that the timer (timouts) set at 309 can be checked and a timeout can occur upon expiration of such timers. In the absence of such expiration, the method can be continued (334). If a timeout occurs, then a failure procedure can begin (illustrated as failure procedure 330).

If there were not duplicates or unmatched calls (see 324), then the method can proceed to a time out determination, where if excessive time has elapsed (332), the method performs the authentication failure procedure (330). Pending the elapse of sufficient time, PBX 118 can wait (334), during which time it can receive further call connect messages, which can be processed according to the above description (see 320). Because this portion of the method is for situations where there is no call that matching ANI information, PBX 118 also can listen on unmatched voice calls for an authentication token that can be used to identify a mobile device (328) and responsively allow voice services to be provided on that voice call.

To sum, the depicted method addresses three possible voice call scenarios: (1) where there is a single voice call that matches identification data for a given authorizeable device, (2) there is at least one voice call that matches identification data for a given device, but there is either a presently unmatched call or there are more than one matching voice calls, and (3) there is no matching call. The method does not rely solely phone number identification information that can be obtained from the voice call, but instead also requires an authentication token to be timely received, which can be inferred to have originated from the desired mobile device, such as by receiving it in a message sent over a secure and authenticated data channel.

Figure 4:
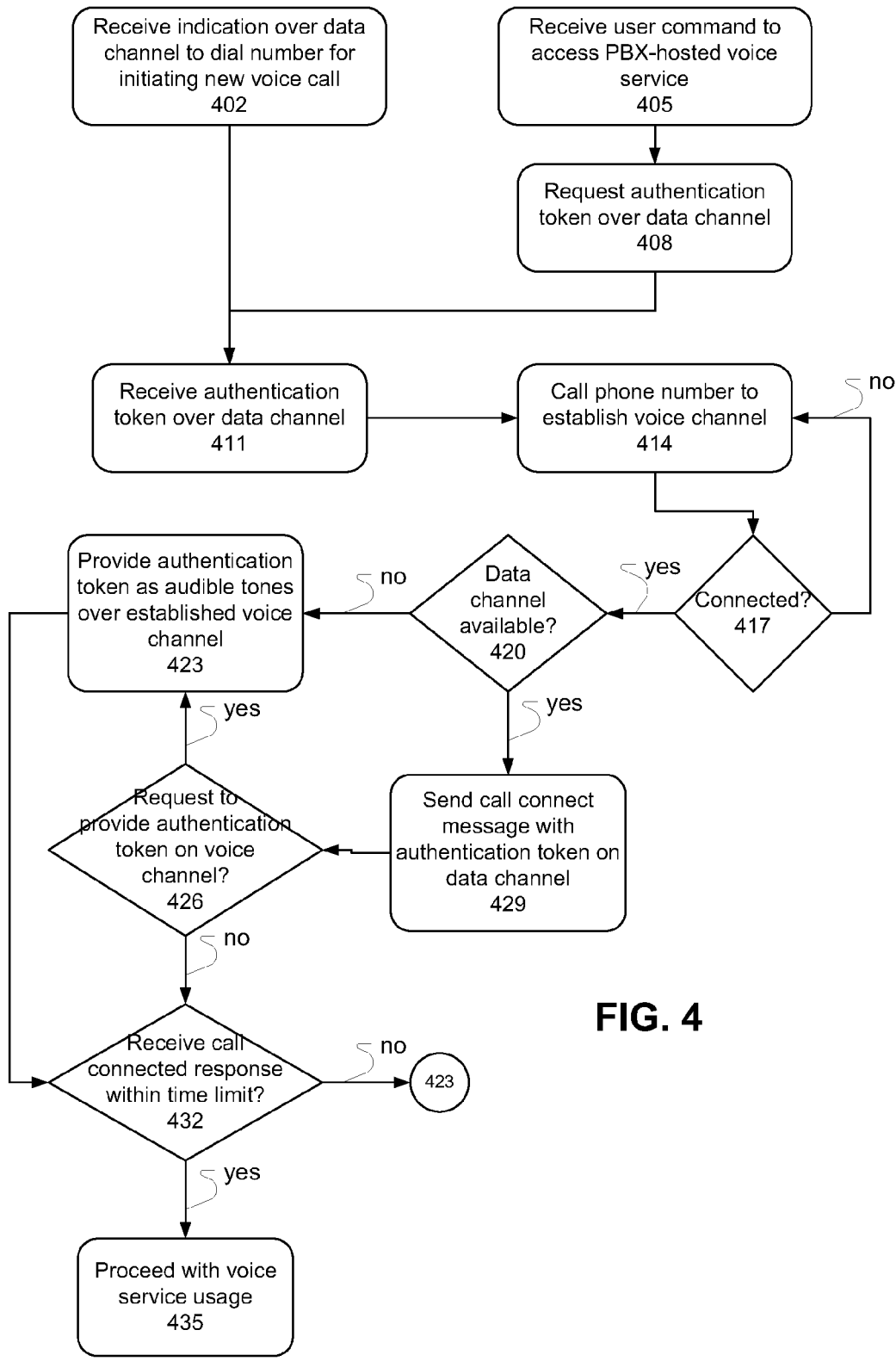
FIG. 4 depicts a method that can be implemented by a device authorizing to use voice services in the system of FIG. 1.

FIG. 4 depicts a method that can be implemented by mobile device 107, to participate with PBX 118 the method of FIG. 3. FIG. 4 depicts that an indication can be received (402) at a mobile device (e.g., device 107) over a data channel to initiate a new voice call; such instruction can include an authentication token, or can be implied by receipt of an authentication token. As further explained above, the indication can include a number to be dialed. As an alternative way to initiate the method aspects described below, mobile device 107 also can receive (405) input indicative of a user command to access PBX-hosted voice services, such as to place a PBX-anchored call. Device 107 can request 408 an authentication token over a data channel responsive to an access command. In either case, device 107 can receive (411) an authentication token over the data channel, and call (414) PBX 118, thus establishing a voice channel with PBX 118.

Upon connection, and depending (420) on whether there is a data channel available, a call connect message can be sent from device 107 to PBX 118, which contains the authentication token that was provided to device 107.

However, if there is no data channel available (420), then the authentication token can instead by provided (423) as audible tones over the voice channel established. Device 107 also can provide (423) the authentication token as audible tones responsive to a request by PBX 118 to do so (see above). Absent such a request, after sending the call connect message with a valid authentication token, device 107 can expect to receive a call connected response within a time limit (can be pre-determined), and if such a call connected response is received (432), then device 107 can proceed (435) with voice service usage.

If the call-connected response was not received within the time limit, then device 107 can provide (423) the authentication token over the voice channel, and proceed with voice service usage (435), typically upon receiving a call connected response (432). The method depicted in FIG. 4 shows that device 107 can supply the authentication token more than once, depending on whether a call connected response was received. In another example, device 107 can hang up the voice call and attempt to establish a new voice call. A new authentication token can be requested, or an authentication token can be obtained from a local storage of previously-downloaded authentication tokens.

Figure 5:
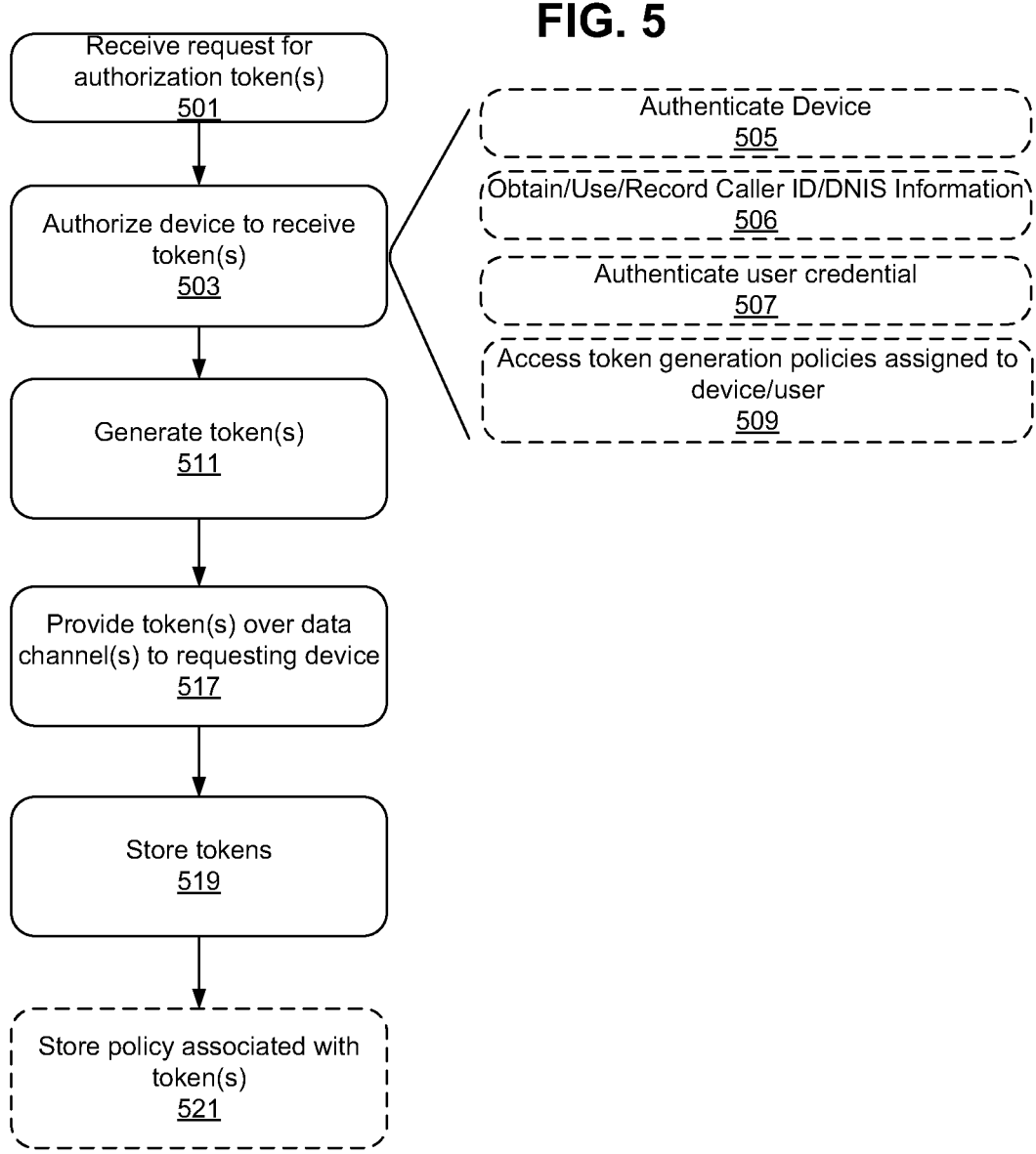
FIG. 5 depicts a method for obtaining authorization tokens for use in authorizing in the systems and methods depicted.

FIG. 5 depicts a method relating to providing authentication tokens to devices, which can be used for authentication procedures according to these disclosures. Such method includes receiving (501) a request for one or more authentication tokens at a server (e.g., at a server implementing PBX 118, or as shown in FIG. 1 at an authentication token generator 123. The device requesting the token(s) can be authorized by the authentication token generator 123 to determine one or more of whether, how many, and what kind of authentication token should be provided to the requesting device.

To perform such authorization (503), the device itself can be authenticated (505), such as by use of a certificate stored on the device. Calling party information derived from Caller ID services or ANI information also can be obtained or used (506) in such authorization.

In addition (or substitution) to device-based authentication, a user of mobile device 107 can be authenticated (507). For example, a password, PIN, or other user credential can be supplied by the user through mobile device 107. By further example, an algorithmically-generated token can be used to authenticate on the data channel (e.g., using an RSA dongle).

Once a user or device is identified and/or authenticated, token generation policies for that device, user, or combination of device and user can be accessed (509). Such accessed token generation policies can be used to determine whether a token should be issued. Such a determination can be based on a variety of conditions or parameters. For example, a token request can be accompanied by a request for a particular service, and the accessed policies can be used to determine whether that service is within authorization for the device or the user. Other aspects of such policies can include whether multiple tokens can be generated, if requested.

Such token generation policies can be associated with one or more of the device and the user. These policies can be used to determine what access should be granted based on a token issued to a particular device or user of a device, including voice services resource access. Such access can be specified as to which resources of a number of resources are to be accessible as well as how many times a given token can be used for authentication. Still further examples can be to allow a given token to provide accessibility to more sensitive resources for a single use and to less-sensitive resources for multiple times. Still other access policies can include an expiration time for the token. Of course, such policies can be used in a mixture, if desired. Still further, different policies can be applied to different devices and different users, and different combinations of users and devices.

One or more tokens, as determined according to the above description, can be generated (511). These generated tokens can be provided over the data channel to mobile device 107. These tokens can be stored in a storage facility available to PBX 118, or to a computation resource programmed to authenticate tokens (such as token storage 124). An access policy also can be stored (5231) with such tokens, which can be used in determining what type of access should be authorized based on each such token.

Figure 6:
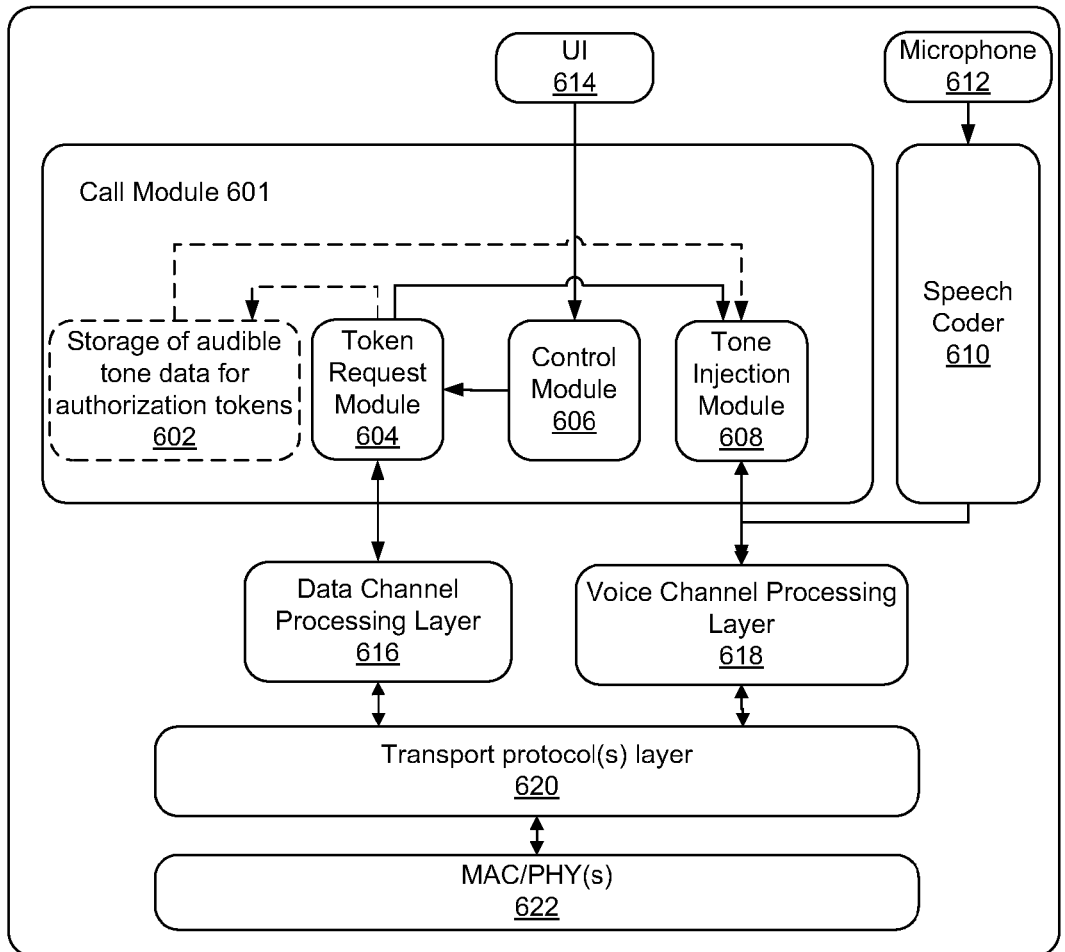
FIG. 6 depicts a functional module view of a mobile device that can request and use authentication tokens for voice resource access according to these examples.

FIG. 6 depicts an example functional module organization of mobile device 107. Call module 601 identifies a logical organization of modules which can be used for implementing aspects described herein. A token request module 604 interfaces with a data channel processing layer 616 to request tokens for use in voice channel authentication. Token request module 604 can operate responsively to input from a user interface 614, which is received by a control module 606. Data descriptive of authentication tokens that have been received can be stored in storage 602, and such data can be received from token request module 604.

The FIG. 6 example of device 107 also depicts a speech coder 610, which receives input from a microphone 612, and a tone injection module 608. Where there is token data storage, storage 602 can communicate with tone injection module 608. Token request module 604 also can communicate data for a received token directly to tone injection module 608 (can be temporarily buffered, the example relating to a sequence of call establishment, which desirably is transparent and prompt from a user perspective). Speech coder 610 and tone injection module 608 both can provide inputs to a voice channel processing layer 618.

Both data channel processing layer 616 and voice channel processing layer 618 can send and receive data to and from transport protocol(s) layer 620, which in turn communicates with MAC/PHY 622.

Figure 7:
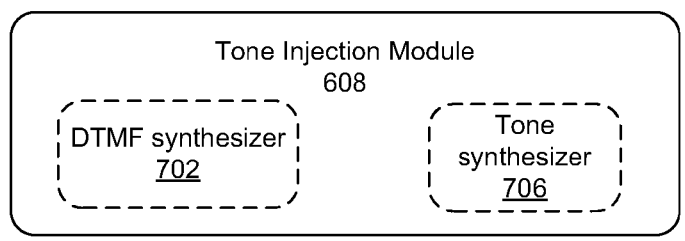
FIG. 7 depicts functional module aspects of a portion of the mobile device view of FIG. 6.

FIG. 7 depicts in more detail example components of tone injection module 608. A DTMF synthesizer 702 can be used for producing DTMF audible tones based on received authentication token data. For example, if the token comprises a series of numbers from 0-9 (or a subset thereof), or letters, or a combination thereof, then those numbers and letters can be mapped to DTMF tones normally associated with them in the PSTN and on standard PSTN devices. Such a DTMF synthesizer typically would be provided with a device capable of communicating on the PSTN, so that it can indicate to the switches what number is to be dialed.

Figure 8:
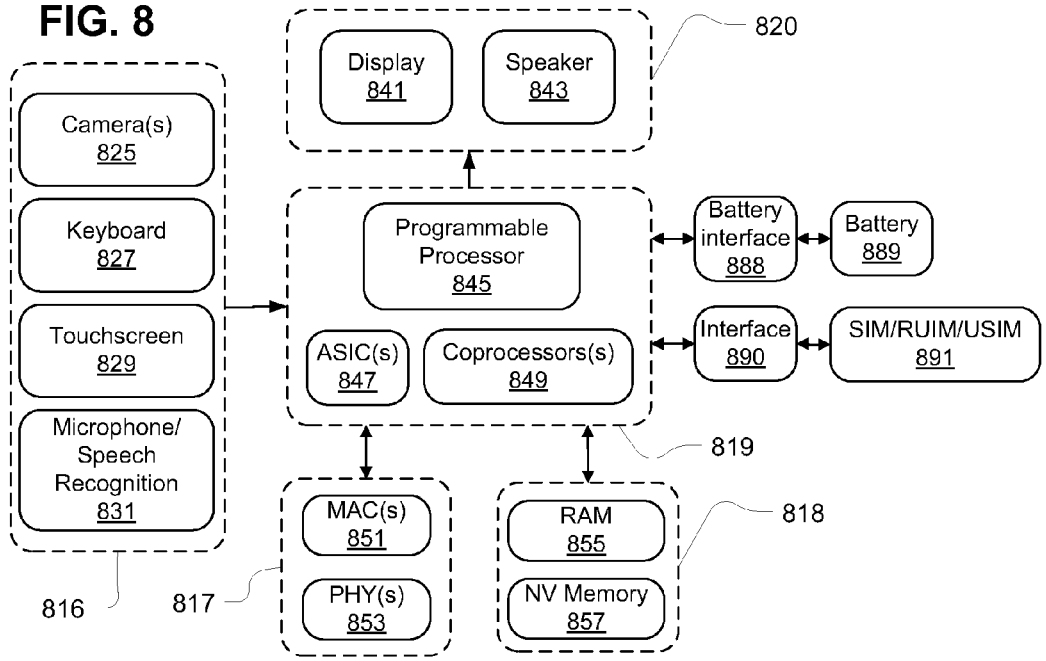
FIG. 8 depicts a physically-oriented view of a mobile device that can function according to these examples.

In other implementations, a separate tone synthesizer 706 can be provided, which can receive generalized inputs for a token, which can be translated into audible tones according to a predetermined format. Thus, the tone injection capability can be provided in a number of ways on mobile device 107. The functional modules presented in FIGS. 6 and 7 can be implemented in a device having componentry according to the example of FIG. 8.

The device depicted may have a variety of components by which user input can be received, including a camera 825, a keyboard 827, a touch screen 829, and a microphone 831 that can be used for speech recognition, for example. These ways of receiving user input can be processed and ultimately couple with processing resource 819 that can be comprised of a plurality of components, such as a programmable processor 845, one or more ASICs 847, as well as other co-processors 849. For example, an ASIC or co-processor may be provided for implementing graphics functionality, encryption and decryption, audio filtering, and other such functions that often involve many repetitive, math-intensive steps. Processing resource 819 also may interface with one or more network interfaces 817, each of which may be comprised of one or more Media Access Controllers (MACs) 851, which in turn interface with physical layers 853.

Processing resource 819 also may interface with a memory resource 818 which may be comprised of a plurality of memories, including a RAM 855, and a non-volatile memory 857, which can be implemented with one or more of Flash memory, PROM, EPROM, and so on. Non-volatile memory 857 can be implemented as flash memory, ferromagnetic, phase-change memory, and other non-volatile memory technologies. Non-volatile memory 857 also can store programs, device state, various user information, one or more operating systems, device configuration data, and other data that may need to be accessed persistently. Processing resource 819 also may interface with user output 820 components, which can include a display 841, as well as a speaker 843, which can be used for text to speech or for performing audio, more generally.

Figure 9:
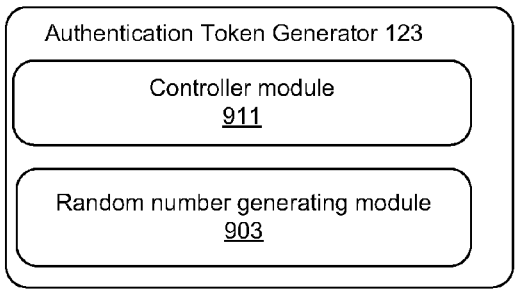
FIG. 9 depicts functional module components of an authentication token generator as described herein.

FIG. 9 depicts example functional modules that can be implemented for an authentication token generator 123 that can be used in example systems according to these disclosures, such as that of FIG. 1. Token generator 123 comprises a controller module 911 provided for controlling operation of other modules of token generator 123. Token generator 123 comprises random number generating module 903, which can be used for generating random numbers that can be used as authentication tokens for voice channel authentication (and more generally, random number generating module 903 may be configured to output random strings of alphanumeric characters, or random binary numbers).

Figure 10:
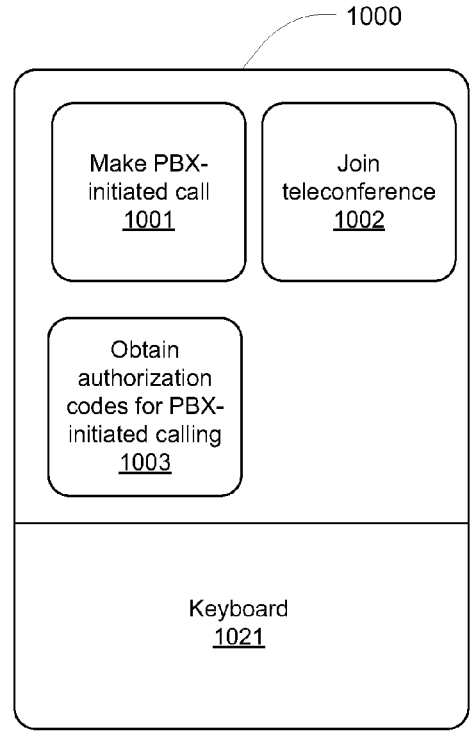
FIG. 10 depicts aspects of a user interface that can be provided on a mobile device for these examples.

FIG. 10 depicts a simplified view of an example user interface 1000 that can be provided for allowing a user to control usage of some aspects described herein. FIG. 10 depicts that user interface 1000 can provide a button (virtual or physical) to allow a user to accept an input indicating a desire to make a PBX-initiated call (e.g., a call from mobile device 107 to PBX 118, and outbound from PBX 118 to a called party). Another depicted option is to allow a user to specify joining of a teleconference, which can responsively engage the methods described above to obtain and use, or use a previously received token over a voice channel that will be established. FIG. 10 also depicts that user interface 1000 can provide an input capability to obtain a plurality of authentication tokens 1003, which can be stored on the device. A plurality of such tokens can be obtained, for example, if the user expects to be outside of data network coverage for a period of time, but nevertheless desires to be able to use voice channel features that are secured by the authentication procedures described above. Such UI aspects also can be implemented by presenting a menu of options from which a selection can be made by providing input through a keyboard 1021, or from other available user input capabilities, such as those depicted in FIG. 8.

As can be discerned from the above description, authentication tokens can be obtained by a mobile device, over a more-secure data channel, for one time use in calling an end point over a less-secure voice channel and authenticating to establish a right to use voice services. The token issuer can communicate with the end point, or with another functional module that validates token information provided over the voice channel by comparing such provided token information with token information previously issued over the data channel (obtained by the mobile device, and issued by a token issuer). The one time token can be invalidated, such that the mobile device requests another token over the data channel for another authentication. The mobile device can be configured to automatically obtain the authentication token over the data channel, call the appropriate end point on the voice channel and module audible tones for the token over the voice channel, without involving a user of the device. Thus, preferably, the above token-related authentication techniques are implemented to be transparent to a user.

Aspects described above can be implemented as computer executable code modules that can be stored on computer readable media, read by one or more processors, and executed thereon. Such computer readable media can be read by such processors over a network, which can be implemented using wired and wireless network technologies.

In addition, separate boxes or illustrated separation of functional elements of illustrated systems does not necessarily require physical separation of such functions, as communications between such elements can occur by way of messaging, function calls, shared memory space, and so on, without any such physical separation.

For example, some functions were attributed to the PBX depicted and described, while other functions were attributed to authentication module, and other functions to an authentication token generator. However, such functions need not be implemented in physically or logically separated platforms.

Although certain disclosures were provided with respect to certain portions of the figures and in certain examples, the structures or functions disclosed therein can be used or adapted for use with the structures or functions disclosed with respect to other portions of the disclosures and figures.

More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

We claim:

1. A method of establishing service over a voice channel, comprising:
   accepting a plurality of calls;
   requesting identifying information for each accepted call, the identifying information including an encrypted identifying authentication token comprising a series of audible tones;
   determining if any of the accepted calls has corresponding identifying information matching identification information corresponding to a first authorizable device;
   determining if any of the accepted calls has corresponding identifying information which does not match any stored identification information;
   determining if any of the accepted calls is one for which no identifying information was obtained;
   for each accepted call which has identifying information which does not match stored identification information and for each accepted call for which no identifying information was obtained, requesting, over data channels of devices initiating those calls, that each such device provide, without a user input, a unique encrypted authentication token over a voice channel corresponding to an accepted call;
   for each authentication token received, determining whether such authentication token matches an authentication token previously provided to a second authorizable device;
   providing voice service via the voice channel over which the matching authentication token was provided;
   requesting over a voice channel, that each device provide an authentication token when a corresponding data channel is not currently operable; and
   thereafter removing each authentication token received from a database of issued and valid tokens; and
   further comprising determining that the identifying authentication token is valid prior to providing voice service to the call having the corresponding identifying authentication token.

2. The method as recited in claim 1, further comprising denying voice service when a first authentication token received matches a second authentication token received.

3. The method as recited in claim 1, wherein requesting identifying information includes securely sending a message over a data channel.

4. The method of claim 1, wherein the voice service is provided via a private branch exchange.

5. A communications device including a voice network interface, the device comprising:
   a microprocessor having a control program associated therewith, the control program being configured to enable the device to:
   accept a plurality of calls through the voice network interface;
   request identifying information for each accepted call, the identifying information including an encrypted identifying authentication token comprising a series of audible tones;
   determine if any of the accepted calls has corresponding identifying information matching identification information corresponding to a first authorizable device;
   determine if any of the accepted calls has corresponding identifying information which does not match any stored identification information
   determine if any of the accepted calls is one for which no identifying information was obtained;
   for each accepted call which has identifying information which does not match stored identification information and for each accepted call for which no identifying information was obtained, request, over data channels of devices initiating those calls, that each such device provide a unique encrypted authentication token over a voice channel corresponding to an accepted call;

for each authentication token received, determine whether such authentication token matches an authentication token previously provided to a second authorizable device;

provide voice service via the voice channel over which the matching authentication token was provided; and thereafter remove each authentication token received from a database of issued and valid tokens, the control program further configured to:

enable the communications device to determine that the identifying authentication token is valid prior to providing voice service to the call having the corresponding identifying authentication token; and enable the communications device to request, over a voice channel, that each device provide an authentication token when a corresponding data channel is not currently operable.

6. The communications device as recited in claim 5, wherein the control program is further configured to enable the device to deny voice service when a first authentication token received matches a second authentication token received.

7. The communications device as recited in claim 5, wherein requesting identifying information includes securely sending a message over a data channel.

8. The communications device as recited in claim 5, wherein the voice service is provided via a private branch exchange.

9. A non-transitory memory storing instructions that, when loaded into a communications device having a voice network interface are executable to control the communications device to:

accept a plurality of calls through the voice network interface;

request identifying information for each accepted call, the identifying information comprising an encrypted authentication token comprising a series of audible tones;

determine if any of the accepted calls has corresponding identifying information matching identification information corresponding to a first authorizable device;

determine if any of the accepted calls has corresponding identifying information which does not match any stored identification information;

determine if any of the accepted calls is one for which no identifying information was obtained;

for each accepted call which has identifying information which does not match stored identification information and for each accepted call for which no identifying information was obtained, request, over data channels of devices initiating those calls, that each such device provide a unique encrypted authentication token over a voice channel corresponding to an accepted call;

for each authentication token received, determine whether such authentication token matches an authentication token previously provided to a second authorizable device;

provide voice service via the voice channel over which the matching authentication token was provided; and thereafter remove each authentication token received from a database of valid and issued tokens;

the control program further configured to:

enable the communications device to determine that the identifying authentication token is valid prior to providing voice service to the call having the corresponding identifying authentication token; and enable the communications device to request, over a voice channel, that each device provide an authentication token when a corresponding data channel is not currently operable.

10. The non-transitory memory as recited in claim 9, storing instructions that when loaded into the communications device are executable to control the device to deny voice service when a first authentication token received matches a second authentication token received.

11. The non-transitory memory as recited in claim 9, wherein requesting identifying information includes securely sending a message over a data channel.

* * * * *

UNITED STATES PATENT AND TRADEMARK OFFICE
CERTIFICATE OF CORRECTION

PATENT NO. : 8,548,432 B2  
APPLICATION NO. : 13/598205  
DATED : October 1, 2013  
INVENTOR(S) : Liam John Keast, Bradford Lawrence Spencer and Manvinder Singh Page 1 of 1

It is certified that error appears in the above-identified patent and that said Letters Patent is hereby corrected as shown below:

In the Specification

Column 6, line 62 reads, "authentication of device3 107 to PBX 118. In such cases, the"  
should read  
-- authentication of device 107 to PBX 118. In such cases, the --.

Column 9, line 39 reads, "policy also can be stored (5231) with such tokens, which can"  
should read  
-- policy also can be stored (521) with such tokens, which can --.

Signed and Sealed this  
Twenty-second Day of April, 2014

Michelle K. Lee  
*Deputy Director of the United States Patent and Trademark Office*